June 2, 1964 P. F. GIRARD 3,135,482

FLEXIBLE WING STOL ASSIST SYSTEM FOR AIRCRAFT

Filed Dec. 26, 1962 6 Sheets-Sheet 1

INVENTOR.
PETER F. GIRARD
BY Knox & Knox

INVENTOR.
PETER F. GIRARD
BY Knox & Knox

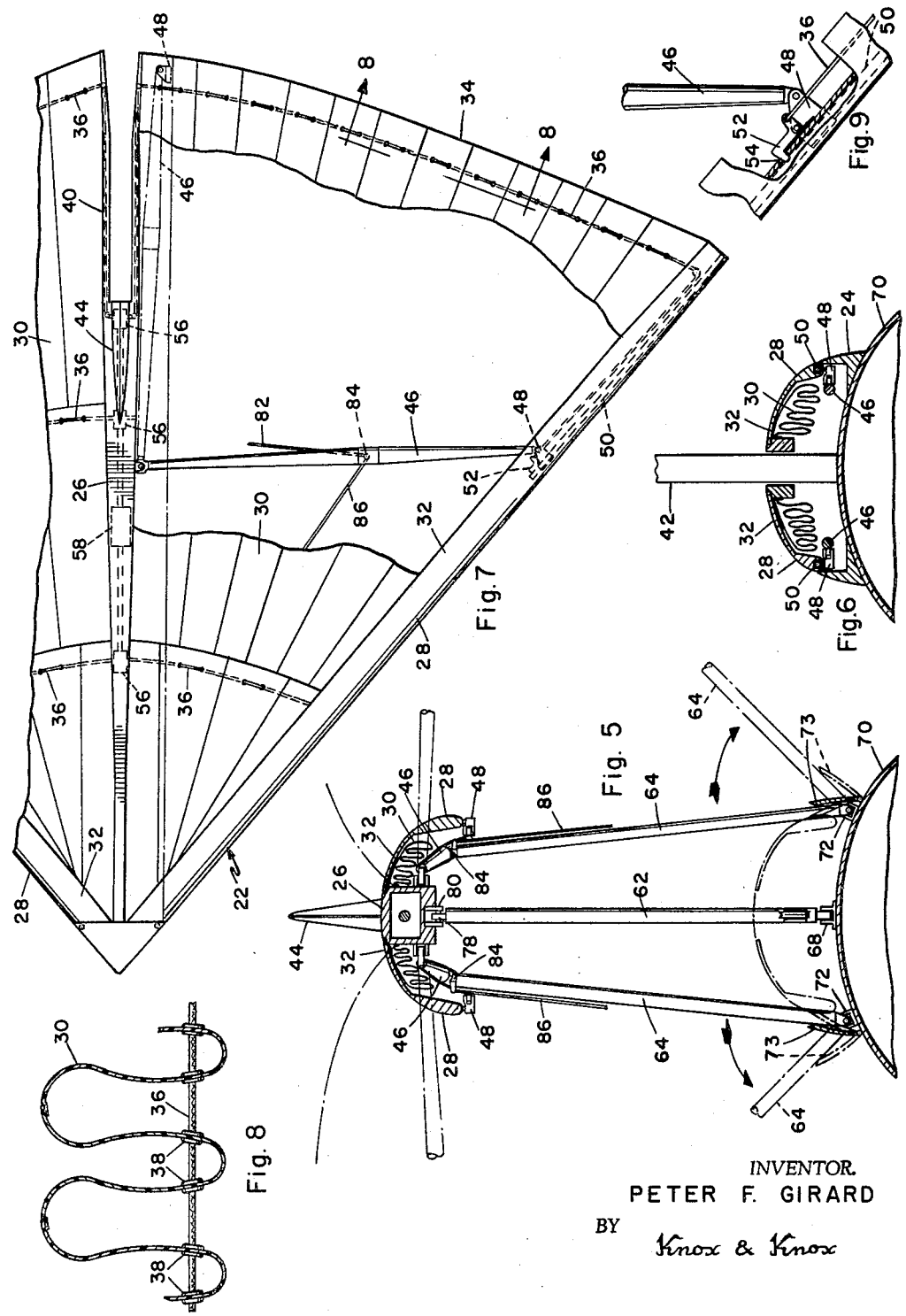

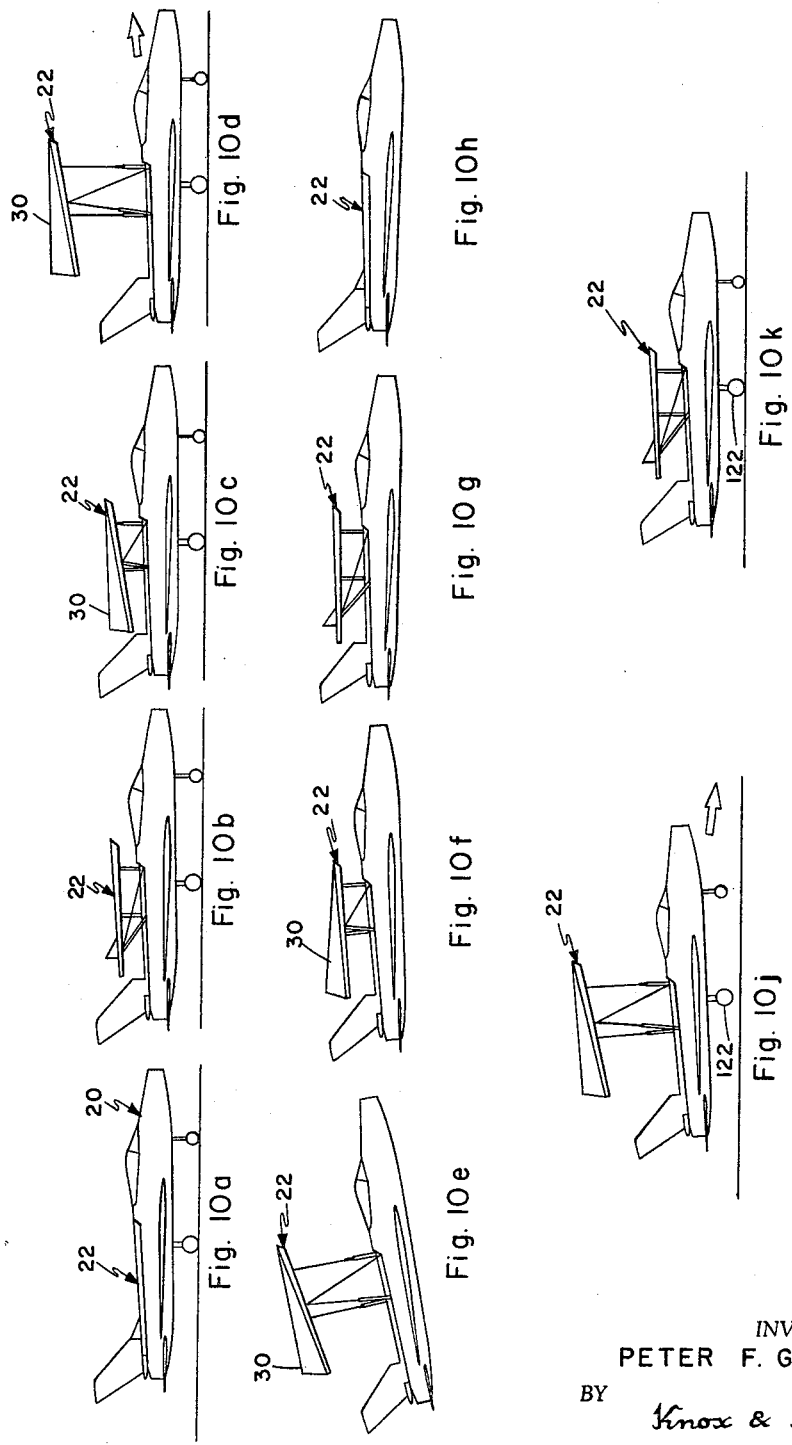

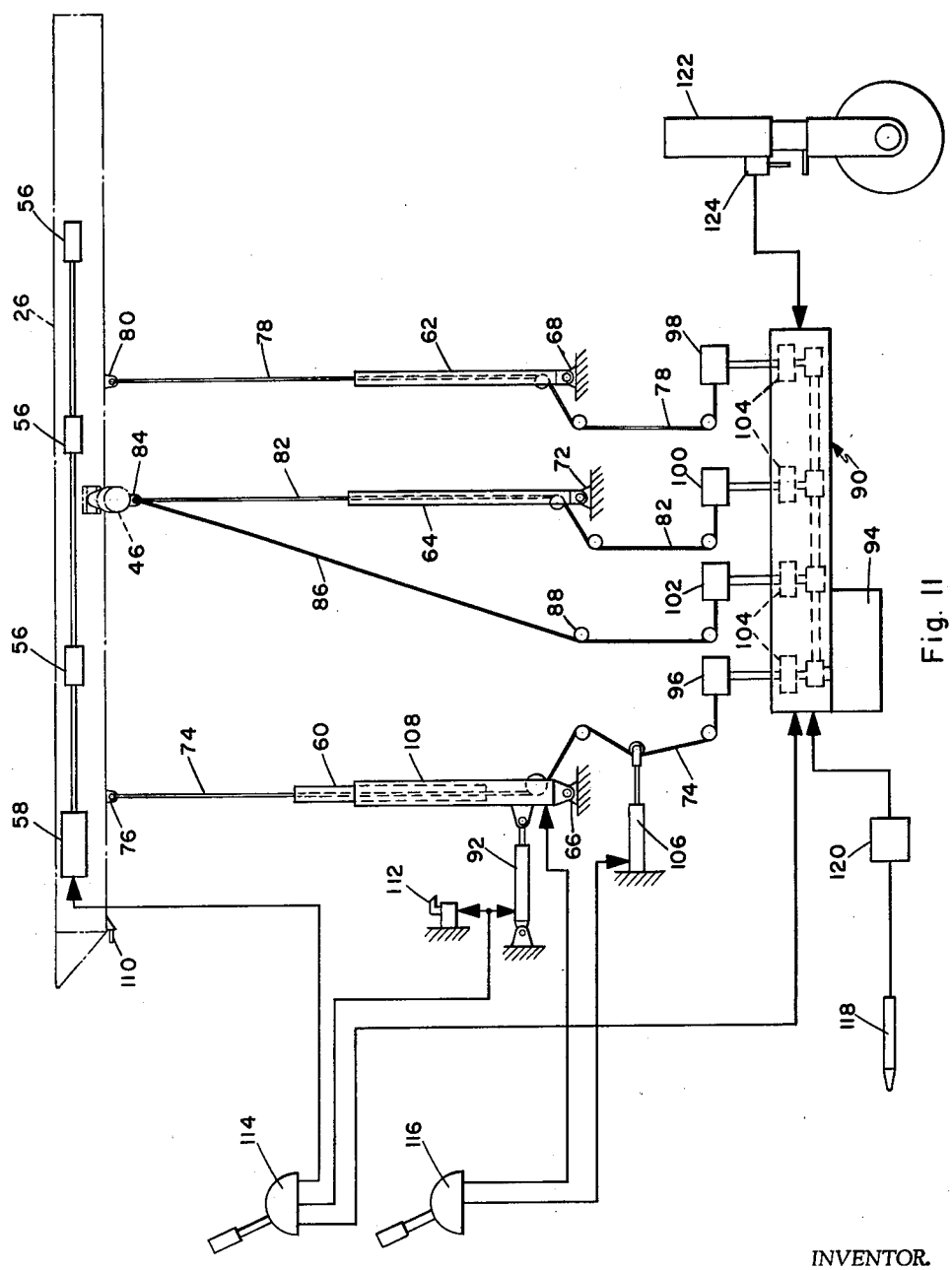

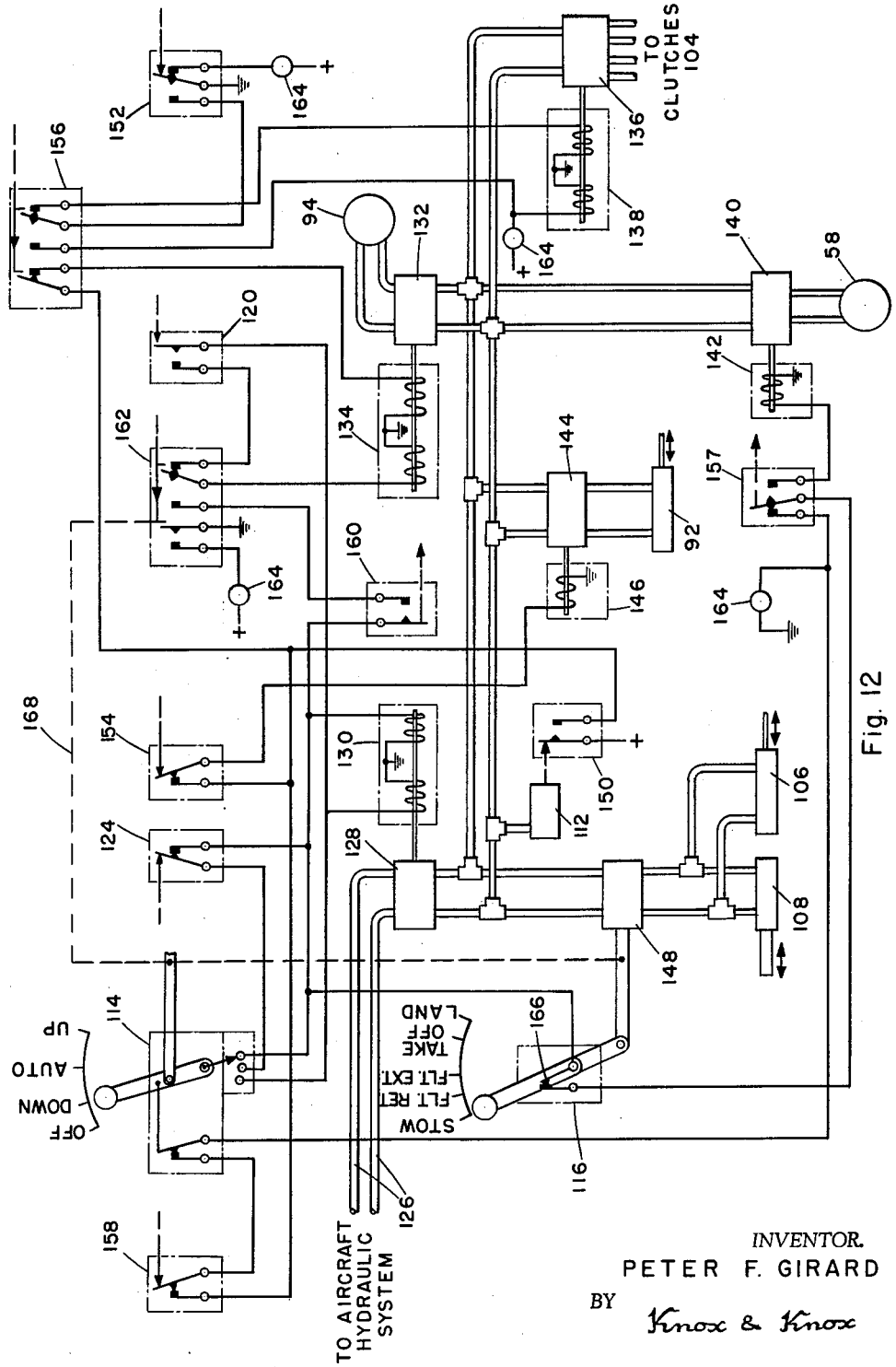

United States Patent Office 3,135,482
Patented June 2, 1964

3,135,482
FLEXIBLE WING STOL ASSIST SYSTEM
FOR AIRCRAFT
Peter F. Girard, La Mesa, Calif., assignor to The Ryan
Aeronautical Co., San Diego, Calif.
Filed Dec. 26, 1962, Ser. No. 247,089
19 Claims. (Cl. 244—43)

The present invention relates generally to aircraft and more particularly to an auxiliary flexible wing STOL assist system for aircraft.

Many types of aircraft, particularly high performance jet aircraft and heavily loaded transports, require a considerable length of runway for take-off and landing. In order to shorten the distance needed and make the aircraft acceptable at a greater number of airfields of limited size, various means have been devised to assist take-off and landing. Rockets and auxiliary engines have been used, but these do not assist the landing since their function is merely to provide added thrust. Extensible portions of the main wings have also been tried, but these are impractical for structural reasons. To assist both take-off and landing the most practical solution is added lifting surface in the form of an auxiliary wing, which must be carried on the aircraft for use when needed. In high performance aircraft, however, the auxiliary wing must not interfere with normal operation or affect the performance unduly.

The primary object of this invention, therefore, is to provide a system to shorten the space required for take-off and landing of an aircraft by using an auxiliary wing which is extended for take-off and landing and is retracted into the aircraft when not in use.

Another object of this invention is to provide an auxiliary wing system wherein the wing is under control at all times and can be stopped or reversed at any time during its operation, yet in normal use is semi-automatic and does not require the attention of the pilot during critical phases of take-off and landing.

Another object of this invention is to provide an auxiliary wing which is self-contained, folds into a compact package which does not adversely affect the performance of high speed aircraft, and in which portions of the wing form the outer covers for the folded wing.

A further object of this invention is to provide an auxiliary wing which extends and retracts smoothly with a minimum of trim change to the aircraft.

Still another object of this invention is to provide an auxiliary wing system which is adaptable to many different aircraft with only minor structural changes.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 5 is an enlarged sectional view taken on line 5—5 of FIGURE 4;

FIGURE 6 is an enlarged sectional view taken on line 6—6 of FIGURE 4, with the wing folded;

FIGURE 7 is an enlarged top plan view of the open wing;

FIGURE 8 is an enlarged sectional view taken on line 8—8 of FIGURE 7;

FIGURE 9 is an enlarged fragmentary view of a portion of FIGURE 7, showing the wing open latch;

FIGURES 10a to 10h, 10j and 10k are diagrammatic views showing the take-off and landing sequence;

FIGURE 11 is a diagram of the basic wing operating system; and

FIGURE 12 is a schematic of the combined electrical and hydraulic systems.

Similar characters of reference indicate similar or identical elements and portions throughout the specification and the views of the drawings.

*Basic System*

Figure 1:
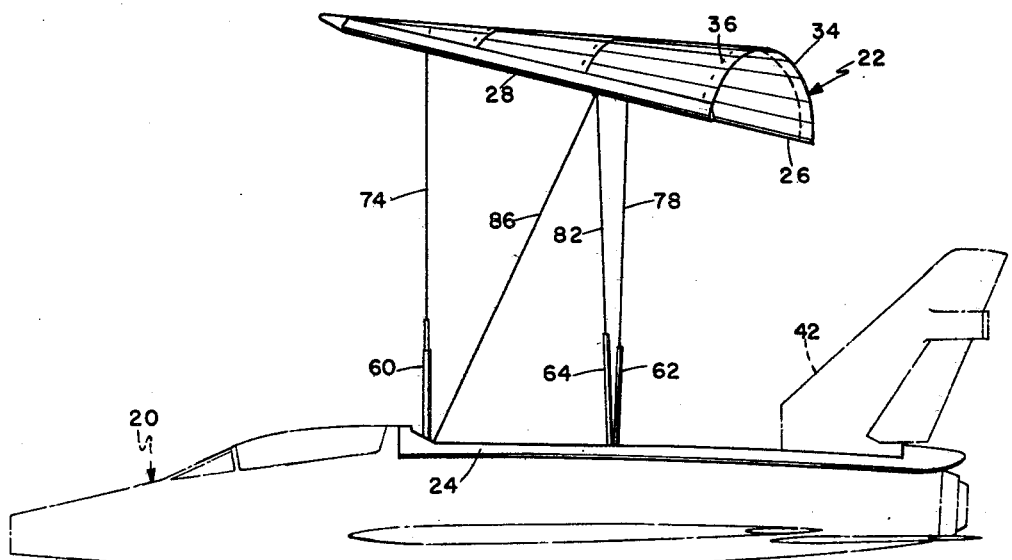
FIGURE 1 is a side elevation view of an aircraft with the auxiliary wing extended.
Figure 2:
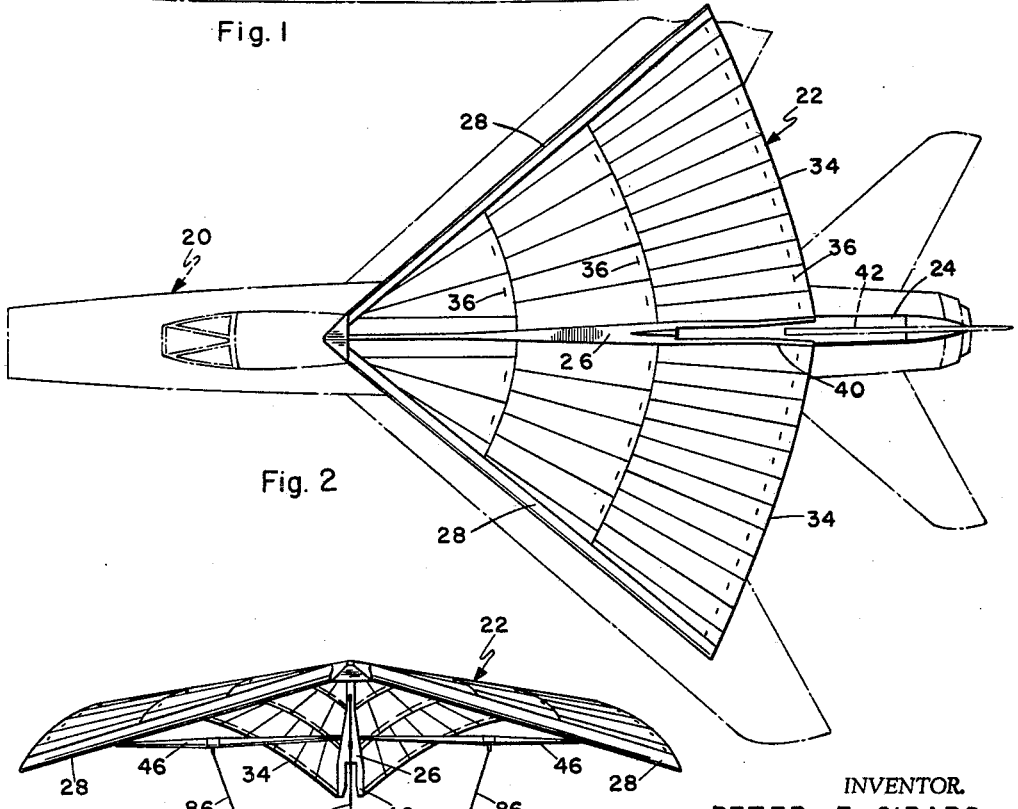
FIGURE 2 is a top plan view thereof.
Figure 3:
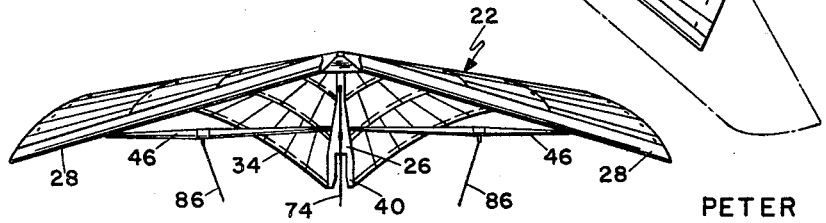
FIGURE 3 is a front elevation view of the extended wing.

As illustrated in FIGURES 1-3, a jet aircraft 20 is provided with an auxiliary wing 22 which extends to a position above the aircraft and greatly increases total lift. When not in use the wing retracts into a fairing 24 along the top of the aircraft and is smoothly enclosed so that performance of the aircraft is not unduly affected. Many types of aircraft may be fitted with this type of auxiliary wing, but the system is most advantageous for high speed jet aircraft which normally require a very long take-off and landing space. The size of the wing, its location on the aircraft and the specific shape of the fairing 24 will depend on the particular aircraft, the drawings illustrating one practical example.

*Wing Structure*

The wing 22 has a rigid longitudinal keel 26 with a pair of leading edge members 28 pivotally attached to the forward end thereof. Secured between the keel 26 and members 28 are lifting panels comprising flexible membranes 30 of generally triangular shape, so that members 28 can swing outwardly to extend the membranes and form a delta type wing. Membranes 30 may be of plastic material reinforced with woven material, rubberized fabric, or any other material with suitable strength, flexibility and non-porous surface to support the necessary air loads. The leading edge members 28 are of streamlined cross section with extended skirt portions 32, the skirt portions being shaped to form extensions of fairing 24 and to enclose the folded wing, as in FIGURE 6. This eliminates the necessity for additional doors and actuating mechanisms. The membranes 30 may be attached along their edges to keel 26 and members 28 in any convenient manner, the trailing edges 34 of said membranes being free and flexible. For convenience the membranes 30 are made in panels secured together and are designed to fold in accordion fashion, said membranes being guided in folding by furling cables 36 threaded through eyelets 38 in the panels, as indicated in FIGURE 8. Three longitudinally spaced furling cables are illustrated in FIGURE 7, extending from the keel 26 to the leading edge members 28, but more or less may be used according to the size of the wing.

In this particular instance the keel 26 has a bifurcated rear portion 40 to straddle the aircraft's fin 42 and on top of the keel is a small portion 44 of the fin. However, on some types of aircraft there may be ample space for the auxiliary wing and such refinements to the wing may not be necessary.

The wing is extended by rigid spreader bars 46 pivotally attached at their inner ends to opposite sides of keel 26, the outer ends of said spreader bars having slide members 48 which ride in tracks 50 in the leading edge members 28. In the folded position the spreader bars 46 lie alongside keel 26, as indicated in broken line in FIGURE 7, with the slide members 48 at the rear ends of tracks 50. When the spreader bars are pulled forwardly the leading edge members are forced outwardly as the slide members advance along the tracks. In the open position the slide members 48 are locked in place by latches 52 which engage sockets 54 in the leading edge members 28, as in FIGURE 9, the latches being connected to and released by the rear furling cables 36. Inside the keel 26 the furling cables 36 are wound on drums 56 driven by a suitable motor 58.

*Wing Erecting Structure*

The wing is supported by struts including a telescopic front strut 60, a rear strut 62 and a pair of lateral struts 64. The front and rear struts 60 and 62 are pivotally attached to brackets 66 and 68, respectively, on the longitudinal axis of the main structure of the aircraft fuselage 70. The lateral struts 64 are universally pivotally attached to brackets 72 adjacent the rear strut bracket and on opposite sides thereof. During wing erection the lateral struts 64 swing forwardly and outwardly and fairing 24 is provided with small hinged portions 73 to open when displaced by said struts, as in FIGURE 5. In retracted position all of the struts lie substantially horizontally within the fairing 24.

Extending through the front strut 60 is a front cable 74 pivotally attached to a lug 76 on the keel 26. Through the rear strut 62 is a rear cable 78 connected to a lug 80 on keel 26. Extending through the lateral struts 64 are lateral cables 82 which are secured to lugs 84 on the spreader bars 46 intermediate their ends. Also connected to lugs 84 are spreader cables 86 which extend forwardly to pulleys 88 adjacent the front strut bracket 66, as in FIGURE 4. All of these cables are connected to a main drive unit 90, illustrated in FIGURE 11 and hereinafter described more fully.

*Wing Actuating System*

Coupled between the fixed structure of fuselage 70 and the front strut 60 is an erecting cylinder 92, which is the primary actuating means for raising and lowering the wing 22. The main drive unit 90 includes a motor 94 connected to four cable winding drums 96, 98, 100, and 102, each having an individual clutch 104, as in FIGURE 11. The specific clutches and driving connections can vary considerably, well known components being adaptable. The front cable 74 is attached to drum 96, rear cable 78 to drum 98, lateral cables 82 to drum 100 and spreader cables 86 to drum 102. Suitable pulleys can be used where necessary to guide the cables. An extensible follow-up cylinder 106 is secured to fixed structure adjacent the front strut 60 and engages the front cable 74. The front strut 60 is itself a telescopic element incorporating a fluid actuated cylinder 108 or the like. At the forward end of keel 26 is a locking pin 110 which, in the closed position of wing 22, is engaged by a locking latch 112 on the fixed aircraft structure.

The pilot is provided with a wing deployment control 114 which can be moved to various positions to extend or retract the wing, said control being connected to the locking latch 112, erecting cylinder 92 and the motor 58. A wing incidence control 116 is also provided and is connected to the front strut cylinder 108 and the follow-up cylinder 106.

An airspeed sensing device, such as a pitot head 118 suitably placed on the aircraft, is connected through a pressure sensitive switch 120 to the drive unit 90 and one landing gear leg 122 is provided with a switch which is coupled to said drive unit, the switch being operated by compression of the leg by the weight of the aircraft during landing.

The combined electrical and hydraulic systems necessary for operation of the auxiliary wing are illustrated in FIGURE 12, taken in conjunction with the diagrammatic representation of FIGURE 11. Conventional electrical and hydraulic components are used and the systems illustrated are merely exemplary for the purpose of description, other arrangements being possible according to the particular aircraft.

The hydraulic system is operated from the existing hydraulic system in the aircraft and the primary supply lines 126 lead to the main selector valve 128, which is operated by a solenoid 130 controlled by the deployment control 114. From the main selector valve 128 hydraulic lines lead through a drive selector valve 132 to the motor 94, the valve being actuated by a solenoid 134. The clutches 104 are operated through a clutch control valve 136 actuated by a solenoid 138. Hydraulic connections are also made to the wing furling motor 58 through a valve 140 controlled by a solenoid 142, and to the erecting cylinder 92 through a valve 144 controlled by a solenoid 146. The front strut cylinder 108 and follow-up cylinder 106 are connected to the supply lines 126 through a valve 148 operated mechanically by the incidence control 116. Locking latch 112 is connected directly to the hydraulic pressure source to operate when valve 128 is actuated to raise the wing.

The various initiating and limit switches are included in the following description of wing operation for purposes of clarity.

*Operating Sequence*

Figure 4:
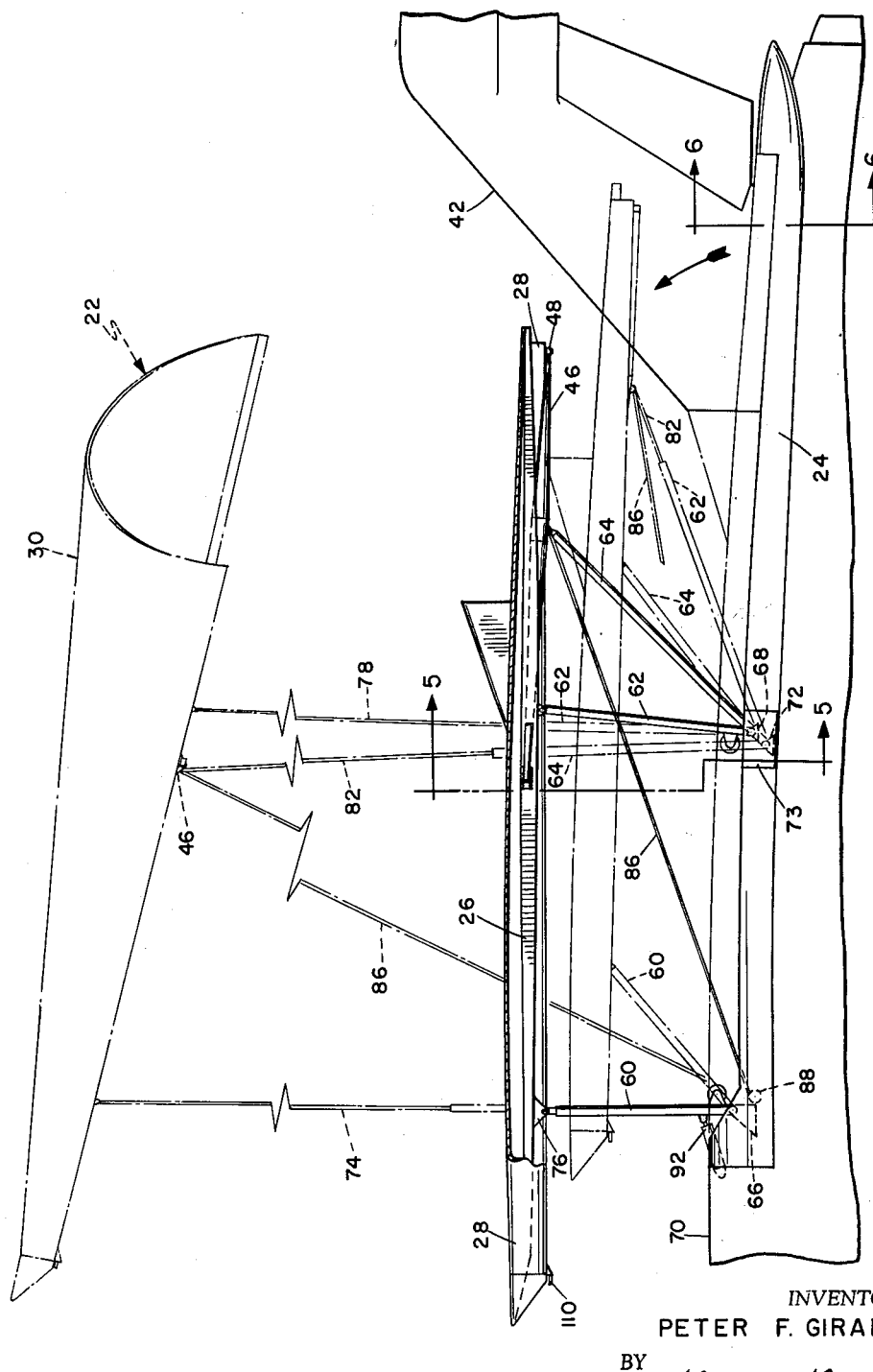
FIGURE 4 is an enlarged side elevation view, partially sectioned, showing the extension operation.

Several steps in the wing opening sequence are indicated in FIGURE 4 and the configurations of the aircraft during various phases are illustrated in FIGURES 10a to 10k.

With the engine operating and the aircraft ready for take-off, as in FIGURE 10a, the deployment control 114 is moved to the UP position, which energizes solenoid 130 to open the main selector valve 128. The initial hydraulic pressure opens locking latch 112 to release locking pin 110, the latch also being connected to a switch 150 which completes a circuit to the solenoid 134, so actuating valve 132 and starting motor 94 after the initial unlatching action. At the same time the erecting cylinder 92 is operated to raise the front strut 60, which pulls the wing 22 forwardly and upwardly together with the other struts 62 and 64, as indicated in the lower broken line position in FIGURE 4 and in FIGURE 10b. Completion of the erecting cylinder stroke, with front strut 60 substantially upright and the wing in the position shown in full line in FIGURE 4, a switch 152 opens and changes the energization of solenoid 138 to engage the clutches 104 in the required manner for opening the wing. In this position the wing 22 is firmly seated on its supporting struts. Motor 94 is in operation and drives drum 102 to reel in spreader cables 86, which pull the spreader bars 46 forwardly and outwardly, the slide members 48 sliding along tracks 50 and swinging the leading edge members 28 outwardly to extend the wing. Wing opening operates a switch 154 to prevent further operation of solenoid 146, thus avoiding the possibility of retracting the open wing onto the fuselage. Completion of wing opening actuates a switch 156 which changes the energization of solenoid 138 and simultaneously shuts off motor 94. The wing is then open with membranes 30 extended and is rigidly held on the supporting struts. A switch 157 actuated by opening of the wing sets the solenoid 142 circuit in condition for subsequent wing folding.

The incidence control 116 is now moved to take-off position, mechanically operating valve 148 to energize front strut cylinder 108 and raise the forward end of wing 22 to the required angle of incidence, as in FIGURE 10c. At the same time follow-up cylinder is actuated to allow for the change in length of cable 74.

The pilot then starts the take-off run in a normal manner. When a predetermined speed has been reached, at which wing 22 is lifting about twice its weight, speed sensitive switch 120 closes and energizes motor 94 to reel out all the cables 74, 78, 82, and 86, allowing the wing to rise well above the aircraft to the upper broken line position of FIGURE 4, and in FIGURE 10d. As soon as the wing lifts off the supporting struts a switch 158 opens to break the wing opening circuit and a switch 160 closes in the solenoid 134 circuit to a position for ultimate closing of the wing. A limit switch 162 is actuated upon full upward extension of the wing to shut off motor 94. Indicator lights 164 may be included in the circuit at appropriate locations to indicate the pertinent positions of the wing, their use being well known.

The combined lift of the existing aircraft wing and the auxiliary wing greatly reduce the length of take-off speed and allow the aircraft to climb more rapidly with a heavy load, as in FIGURE 10e. When a safe altitude has been reached the incidence control 116 is moved to a FLIGHT RETRACT position, which mechanically moves valve 148 to operate cylinder 108 and follow-up cylinder 106 and partially retract front cable 74. This reduces the incidence of wing 22 and transfers most of the lift to the main aircraft wing. The auxiliary wing 22 is designed so that there is always a slight lift with the wing open in order to keep the suspension cables tight and prevent collapse of the auxiliary wing. Deployment control 114 is now moved to DOWN position which reverses the main selector valve 128 and starts motor 94, the clutches 104 being set so that all of the cables are reeled in and the wing 22 is seated down on its struts, still in open position, as in FIGURE 10f. The incidence control 116 is then moved to STOW position, which closes a switch 166 built into the control and starts the motor 58 to reel in furling cables 36. Tension on the rear furling cables 36 releases latches 52 and continued pull swings the spreader bars 46 rearwardly and inwardly, so closing the leading edge members 28 against keel 26, as in FIGURE 10g. The furling cables 36 guide the membranes 30 into pleated folds, as in FIGURE 8 and ensure proper folding of the wing without fluttering. The various switches actuated by opening and extension of the wing are now all reversed. Completion of wing folding operates switch 157 and shuts off motor 58. Switch 154 is also closed and causes operation of the erecting cylinder to retract the front strut 60, so swinging the closed wing rearwardly and downwardly into fairing 24, the locking latch 112 engaging and locking the wing in closed position, illustrated in FIGURE 10h.

To prepare for landing the incidence control 116 is moved to a FLIGHT EXTENSION position, then the deployment control 114 is moved to UP position. This initiates a sequence similar to the wing opening and extending sequence described above, except that the position of valve 148 in the FLIGHT EXTENSION positions holds the wing to a lower angle of incidence than that used for take-off. With the aircraft already flying at considerable speed the pressure sensitive switch 120 will start the extension as soon as the wing is open. When the wing 22 reaches full extension position the limit switch 162 is actuated to stop motor 94 and, through a mechanical coupling indicated schematically at 168, moves the deployment control 114 to AUTOMATIC position and incidence control 116 to LAND position. The latter action causes an increase in wing incidence to the angle required for proper landing, as in FIGURE 10j. Movement of the deployment control 114 to AUTOMATIC position completes a circuit through switch 124 on landing gear leg 122 which, when the weight of the aircraft is applied upon touchdown, initiates the wing folding and stowing sequence in the manner described above. FIGURE 10k illustrates the wing partially folded during the landing run. The additional lift provided by wing 22 during the landing approach greatly reduces the necessary flying speed and shortens the landing run.

An important feature of the system is that the controls for the auxiliary wing are operated during non-critical phases of aircraft handling. Initial deployment is made before starting the take-off run, after which the controls are not touched until the aircraft is in normal flight at a safe altitude. For landing the wing is deployed in the early stages of the approach and retraction is automatic at touchdown. Thus the pilot is not distracted from safe operation of the aircraft. In the event of an emergency the operational sequence can be stopped or reversed at any time by appropriate movement of controls 114 and 116. Trim changes caused by extension and retraction of the auxiliary wing are negligible and easily allowed for by the pilot, while the incidence changes occur at non-critical times when stability is not marginal. The wing is stable at all positions with no tendency to oscillate and the airflow does not interfere with the normal control surfaces of the aircraft. In stowed position the keel and leading edge members form the major portion of the wing enclosure and provide a smoothly faired structural element which does not adversely affect aircraft performance.

It is understood that minor variation from the form of the invention disclosed herein may be made without departure from the spirit and scope of the invention, and that the specification and drawing are to be considered as merely illustrative rather than limiting.

I claim:
1. A STOL assist system for aircraft, comprising:
   an auxiliary wing for attachment to an aircraft;
   said auxiliary wing having foldable lifting panels;
   an elongated enclosure into which said wing is foldable;
   erecting means to raise said wing above the aircraft in folded condition in longitudinal alignment with the aircraft;
   means to open said wing and extend said lifting panels laterally on opposite sides thereof;
   control means connected to said wing to adjust the angle of incidence thereof to predetermined positions relative to the aircraft;
   and means to fold and retract said wing into said enclosure.

2. A STOL assist system for an aircraft, comprising:
   an auxiliary wing attached to the aircraft;
   said wing having a longitudinal central keel, leading edge members pivotally attached to the forward end of said keel on opposite sides thereof, and flexible lifting panels connected between said keel and said leading edge members;
   said wing being foldable into a closed position on the aircraft;
   erecting means to raise said wing above the aircraft;
   means to open said wing and extend said lifting panels in the raised position of the wing;
   and means to fold and retract said wing.

3. A STOL assist system for an aircraft, comprising:
   an auxiliary wing attached to the aircraft;
   said wing having foldable lifting panels;
   erecting means to raise said wing to a first, partially extended position above the aircraft;
   means to open said wing and extend said lifting panels in said first position;
   extension means to extend said wing to a second, further raised position above the aircraft substantially clear of the airflow around the aircraft;
   and means to fold and retract said wing.

4. A STOL assist system for an aircraft, comprising:
   an auxiliary wing attached to the aircraft;
   said wing having foldable lifting panels;
   erecting means to raise said wing to a first, partially extended position above the aircraft;
   means to open said wing and extend said lifting panels in said first position;
   extension means to extend said wing to a second, further raised position above the aircraft substantially clear of the airflow around the aircraft;
   control means coupled to said wing to control the angle of incidence thereof relative to the aircraft in both the first and second positions;
   and means to fold and retract said wing.

5. A STOL assist system for an aircraft, comprising:
   an auxiliary wing having foldable lifting panels;
   a plurality of struts pivotally attached to the aircraft and connected to said wing;
   erecting means connected to said struts to raise said wing to a first position above the aircraft with the wing supported on said struts;

means to open said wing and extend said lifting panels in said first position;

extension cables attached to said wing and passing through said struts;

extension means to extend said cables and raise said wing to a second position above the aircraft substantially clear of the airflow around the aircraft;

and means to fold and retract said wing.

6. A STOL assist system for an aircraft, comprising:

an auxiliary wing having a longitudinal central keel, leading edge members pivotally attached to the forward end of said keel on opposite sides thereof, and flexible lifting panels connected between said keel and said leading edge members;

said wing being foldable into a closed position on the aircraft;

a plurality of struts including a front strut and a rear strut pivotally attached to the aircraft and connected to said keel;

erecting means connected to said struts to raise the struts with said wing supported thereon to a position spaced above the aircraft;

spreader means to spread said leading edge members and open said lifting panels in said spaced position;

said front strut being telescopic to adjust the angle of incidence of said wing to predetermined positions relative to the aircraft;

and means to close and retract said wing.

7. A STOL assist system for an aircraft, comprising:

an auxiliary wing having a longitudinal central keel, leading edge members pivotally attached to the forward end of said keel on opposite sides thereof, and flexible lifting panels connected between said keel and said leading edge members;

said wing being foldable into a closed position on the aircraft;

a plurality of struts including a front strut and a rear strut pivotally attached to the aircraft and connected to said keel;

erecting means connected to said struts to raise the struts with said wing supported thereon in a position spaced above said aircraft;

spreader means to spread said leading edge members and open said lifting panels in said spaced position;

a plurality of longitudinally spaced furling cables attached to said leading edge members and extending to said keel;

said furling cables being slidably threaded through spaced portions of said lifting panels to guide the panels into predetermined folds;

and means to pull said furling cables inwardly to close said wing.

8. A STOL assist system according to claim 7, wherein said spreader means comprises:

spreader bars pivotally attached to opposite sides of said keel and having end portions connected to said leading edge members to slide longitudinally therein;

spreader cables attached to said spreader bars;

means to pull said spreader cables forwardly and extend said spreader bars;

latch means on said spreader bar end portions engaging said leading edge members in the open position of said wing;

certain of said furling cables being coupled to said latches to release the same upon closing of said wing.

9. A STOL assist system according to claim 7, wherein said leading edge members have inwardly extended longitudinal skirt portions which abut said keel longitudinally in closed position and enclose the folded lifting panels.

10. A STOL assist system for an aircraft, comprising:

an auxiliary wing having foldable lifting panels;

support means pivotally attached to the aircraft and connected to said wing;

erecting means coupled to said support means to raise said wing above the aircraft in a first raised position seated on said support means;

means to open said wing and extend said lifting panels upon reaching said first position;

extensible means in said support means to allow said open wing to rise to a second raised position substantially clear of the airflow around the aircraft;

and means to fold said wing and retract said support means.

11. A STOL assist system for an aircraft, comprising:

an auxiliary wing having foldable lifting panels;

a plurality of support struts including a front strut and a rear strut pivotally attached to the aircraft and connected to said wing;

said wing having a closed position with said struts retracted;

erecting means coupled to said struts to raise said wing to a first raised position above the aircraft;

means initiated by erection of said wing to open said lifting panels;

extensible means in said struts to allow said wing to rise to a second raised position;

and means to fold said wing and retract said support struts.

12. A STOL assist system according to claim 11 and including:

a latch engageable with said wing to secure the wing in said closed position;

and actuating means coupled to said latch to operate said erecting means upon release of the latch.

13. A STOL assist system for an aircraft, comprising:

an auxiliary wing having foldable lifting panels;

a plurality of support struts including a front strut and a rear strut pivotally attached to the aircraft and connected to said wing;

said wing having a closed position with said struts retracted;

erecting means coupled to said struts to raise said wing to a first raised position above the aircraft;

means initiated by erection of said wing to open said lifting panels;

extensible cables extending through said struts and being connected to said wing;

drive means coupled to said cables to extend the cables and move said open wing to a second raised position;

said drive means being reversible to retract said cables and return said wing to said first raised position;

means to fold said lifting panels while in said first raised position;

and means to retract said struts upon completion of folding of said lifting panels.

14. A STOL assist system according to claim 13 and including:

a speed sensitive switch connected to said drive means to initiate extension of said cables at a predetermined speed of the aircraft.

15. A STOL assist system according to claim 13 and including:

incidence control means connected to said front strut and to the cable therein to adjust the angle of incidence of said wing in both the first and second raised positions.

16. A STOL assist system according to claim 13 and including:

a ground contact switch connected to said drive means to initiate retraction of said cables and return of said wing to said closed position upon landing of the aircraft.

17. A STOL assist system for aircraft, comprising:

an auxiliary wing attached to the aircraft;

said wing having a longitudinal central keel, leading edge members pivotally attached to the forward end of said keel on opposite sides thereof, and flexible lifting panels connected between said keel and said leading edge members;

said wing being foldable into a closed position on the aircraft;

erecting means to raise said wing above the aircraft;

means to open said wing and extend said lifting panels in the raised position of the wing;

means to fold and retract said wing;

said keel and said leading edge members abutting in the closed position and forming an enclosure for said lifting panels when folded.

18. A STOL assist system for an aircraft, comprising:

an auxiliary wing having a longitudinal central keel, leading edge members pivotally attached to the forward end of said keel on opposite sides thereof, and flexible lifting panels connected between said keel and said leading edge members;

said wing being foldable into a closed position on the aircraft;

a plurality of struts including a front strut and a rear strut pivotally attached to the aircraft and connected to said keel;

erecting means connected to said struts to raise the struts with said wing supported thereon to a position spaced above the aircraft;

spreader bars pivotally attached to opposite sides of said keel and having end portions connected to said leading edge members to slide longitudinally thereon;

means to swing said spreader bars selectively forwardly and rearwardly to open and close said wing;

lateral struts pivotally attached to the aircraft and pivotally connected to said spreader bars intermediate the ends thereof;

said front strut being telescopic to adjust the angle of incidence of said wing to predetermined positions relative to the aircraft;

and means to close and retract said wing.

19. A STOL assist system according to claim 18 and including:

cables extending through said struts and being attached to said keel and said spreader bars;

and means to extend and retract said cables selectively to move said wing between said spaced position and a further spaced position above the aircraft clear of said struts.

References Cited in the file of this patent

UNITED STATES PATENTS

| | | |
|---|---|---|
| 1,054,374 | Voigt | Feb. 25, 1913 |
| 2,989,268 | Andrews | June 20, 1961 |

FOREIGN PATENTS

| | | |
|---|---|---|
| 540,728 | Canada | May 7, 1957 |